April 18, 1967 P. L. GRANEY ET AL 3,314,673
SPRING SHACKLE AND METHOD OF MANUFACTURE THEREOF
Filed March 3, 1965
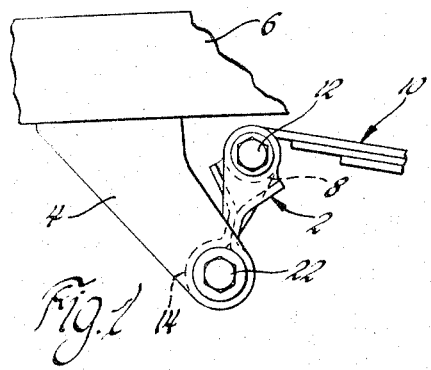
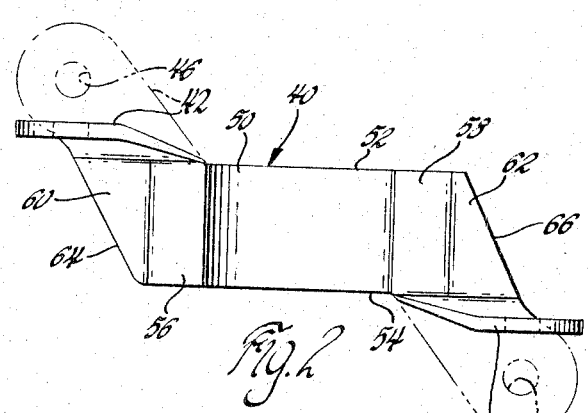
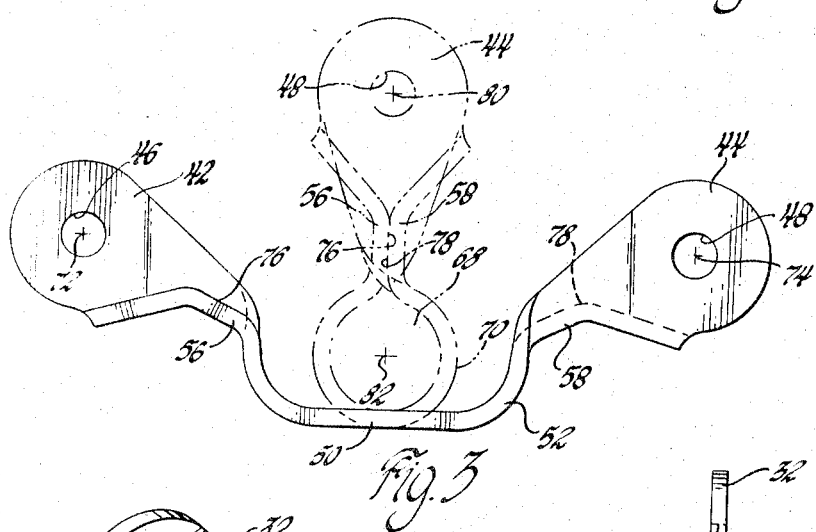
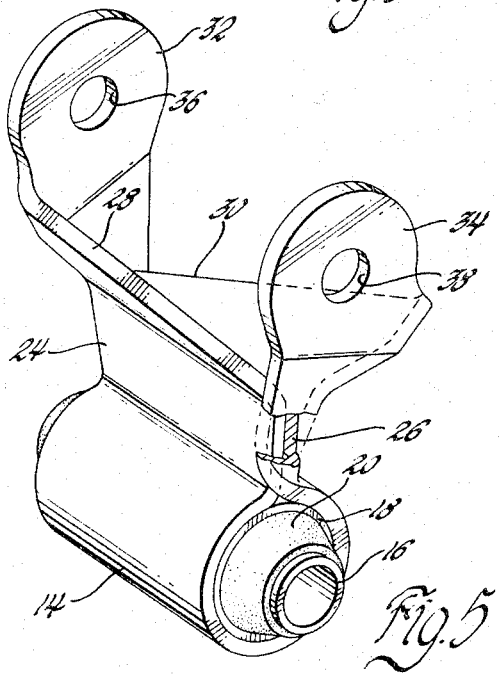
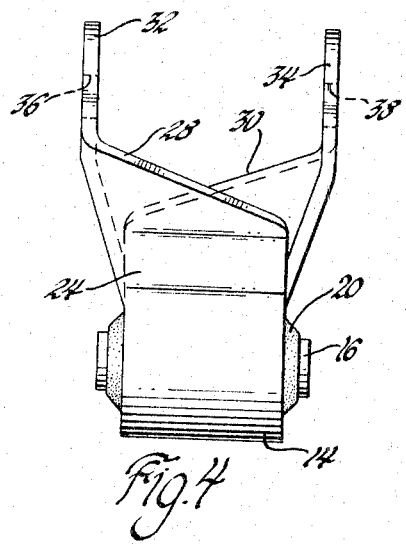
INVENTORS
Paul L. Graney &
BY Gilbert L. Hansen
W. F. Wagner
ATTORNEY "# United States Patent Office 3,314,673
Patented Apr. 18, 1967

3,314,673
SPRING SHACKLE AND METHOD OF MANUFACTURE THEREOF
Paul L. Graney, Grosse Pointe, and Gilbert L. Hansen, New Baltimore, Mich., assignors to General Motors Corporation, Detroit, Mich., a corporation of Delaware
Filed Mar. 3, 1965, Ser. No. 436,843
5 Claims. (Cl. 267—54)

This invention relates to vehicle suspension and more particularly to a spring shackle for pivotally supporting one end of a leaf spring on a vehicle frame.

An object of the invention is to provide an improved spring shackle.

Another object is to provide an improved one-piece sheet metal spring shackle.

A further object is to provide a spring shackle of the type described wherein load and stress is uniformly distributed throughout the body of the shackle.

A still further object is to provide a simplified and improved method of manufacturing a one-piece sheet metal spring shackle.

These and other objects, advantages and features of the invention will become more readily apparent as reference is had to the accompanying specification and drawing wherein:

FIGURE 1 is a fragmentary side elevational view of a suspension structure incorporating a spring shackle in accordance with the invention;

FIGURE 2 is a two-stage plan view of a sheet metal perform utilized in constructing the invention;

FIGURE 3 illustrates two additional stages of development of the preform into the finished spring shackle;

FIGURE 4 is an end elevation view of the shackle shown in FIGURE 1; and

FIGURE 5 is a perspective view of the shackle.

Referring to FIGURE 1, there is shown a portion of a vehicle suspension in which a shackle 2 embodying the invention is pivotally mounted at its lower end to spaced leg portions 4 projecting downwardly from the vehicle frame 6. The wrapped eye 8 of the upper leaf of a laminated leaf spring 10 is pivotally connected to the upper end of the shackle by an eye bolt 12. It will be understood that the usual vehicle wheel axle, not shown, is connected to spring 10 so that the vehicle frame 6 is elastically supported relative to the ground surface.

As seen best in FIGURES 4 and 5, shackle 2 is a one-piece sheet metal member including a lower cylindrical portion 14 formed by wrapping the longitudinal midportion of an elongated metal strip to form an eye in which is disposed an inner tubular metal element 16 and an outer tubular metal member 18 having an annular elastic element 20 bonded therebetween. As will be evident from FIGURE 1, inner tubular element 16 is adapted to receive a bolt 22 which extends through the laterally spaced leg portions 4. Vertically adjacent tubular portion 14, the sheet metal member is formed with two parallel abutting intermediate flat portions 24 and 26 which project radially upwardly from tubular portion 14 in alignment with the axis thereof and are secured together as by riveting or welding. At their outer extremities flat portions 24 and 26 are sheared to provide diagonal edge portions 28 and 30 of opposite inclinations which merge into bent side walls or ears 32 and 34. Ears 32 and 34 are aligned in parallel planes normal to the axis of tubular portion 14 and are pierced with central apertures 36 and 38 defining a common axis parallel with the axis of tubular portion 14 and through which extends the bolt 12 for securing spring eye 8, as previously described.

As will be evident from FIGURES 4 and 5, a construction according to the invention affords the singular advantage not provided by the prior art in that all loads such as twisting, tension and lateral deflection are distributed equally between the two folded halves which form the tubular portion 14 and terminate in ears 32 and 34; that is, load exerted on ear 34 is absorbed through the right hand section of the sheet metal member (as viewed in FIGURE 5), while load exerted on ear 32 is absorbed through the left hand section of the sheet metal member. This feature coupled with the diagonal tapering portions 28 and 30 results in an extremely strong shackle element with exceptional ability to withstand virtually any stresses exerted thereon. By contrast, prior art sheet metal shackle members conventionally form ears equivalent to ears 32 and 34 on one end of the sheet metal element and merely wrap the opposite end to form a tubular portion 14, with the result that loads of the type previously described are absorbed entirely by only one thickness of the sheet metal.

In FIGURES 2 and 3 there are shown progressive developmental steps in fabricating a shackle member incorporating the invention. For the purposes of descriptive clarity, a new sequence of reference numerals will be employed. FIGURE 2 illustrates in solid lines an intermediate preform developed from an original flat sheet metal blank 40 shown partially in dotted lines. The original flat blank 40 presents a generally rectangular plan form having laterally oppositely extending projections 42 and 44 disposed at longitudinal opposite ends thereof formed with central apertures 46 and 48. This blank is then shaped in a suitable press to the intermediate preform providing a rectangular central flat body portion 50 having parallel side edges 52 and 54, intermediate flat body portions 56 and 58, and wedge shaped end portions 60 and 62, the outer extremities of which are sheared to form parallel edges 64 and 66 lying at an angle to the longitudinal centerline of the blank. Projections 42 and 44 are bent up to lie in parallel planes laterally outwardly offset from the side edges 52 and 54 of central body portion 50.

After preforming as illustrated in FIGURE 2, the sheet metal member is placed in suitable press forming equipment for progressive shaping and wrap forming as illustrated sequentially in solid and dash-dot lines in FIGURE 3 wherein intermediate body portions 56 and 58 and wedge portions 60 and 62 are angularly oriented and the central body portion 50 is progressively curled or wrapped upwardly around a suitable mandrel 68 to develop a tubular portion 70. Simultaneously the intermediate body portions 56 and 58 come into abutting engagement and are subsequently spot or tack welded together. Since the geometric centers 72 and 74 of apertures 46 and 48 in projections 42 and 44 are aligned with planes containing the top surface 76 and 78 of the adjacent intermediate portions 56 and 58 when the latter are angularly oriented as previously described, when intermediate portions 56 and 58 are spot welded together, apertures 46 and 48 are brought into alignment on a common axis 80 parallel with the axis 82 of mandrel 68 while the wedge portions 60 and 62 form lateral reinforcing struts which impart structural stability to projections 42 and 44.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. A one-piece sheet metal spring shackle comprising, a single sheet metal strip bent about a transverse axis at the longitudinal median portion thereof to form a lower cylindrical portion, an intermediate flat portion and an upper portion including parallel laterally spaced apertured ears aligned in planes perpendicular to the axis of said cylindrical portion, said ear being formed respectively on opposite ends of said strip.

2. The structure set forth in claim 1 wherein the plane of said intermediate flat portion coincides with the axis of said cylinder.

3. The structure set forth in claim 1 wherein said intermediate flat portion comprises two abutting portions of said strip.

4. The structure set forth in claim 2 wherein said upper end portions include wedge shaped end portions inclined oppositely outwardly from the plane of said intermediate portion.

5. The structure set forth in claim 4 wherein said wedge shaped portions define oppositely inclined terminal edges extending between said ears and said intermediate portion.

References Cited by the Examiner
UNITED STATES PATENTS

| | | | |
|---|---|---|---|
| 1,964,770 | 7/1934 | Runge | 29—150 |
| 3,030,101 | 4/1962 | McIntosh | 267—54 |

ARTHUR L. LA POINTE, *Primary Examiner.*

R. M. WOHEFARTH, *Assistant Examiner.*